United States Patent
Cherukumudi et al.

(10) Patent No.: US 8,484,482 B1
(45) Date of Patent: Jul. 9, 2013

(54) PASSWORD GENERATION AND VALIDATION SYSTEM AND METHOD

(75) Inventors: Vijaykumar Cherukumudi, Overland Park, KS (US); David K. Fultz, Raymore, MO (US); Richard A. Rofail, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 237 days.

(21) Appl. No.: 13/042,015

(22) Filed: Mar. 7, 2011

(51) Int. Cl.
*G06F 21/00* (2006.01)

(52) U.S. Cl.
USPC ............. 713/184; 713/183; 713/180; 726/26

(58) Field of Classification Search
USPC ........................................................ 713/184
See application file for complete search history.

(56) References Cited

U.S. PATENT DOCUMENTS

| | | | |
|---|---|---|---|
| 4,800,590 A * | 1/1989 | Vaughan | 713/184 |
| 5,588,056 A | 12/1996 | Ganesan | |
| 5,592,553 A | 1/1997 | Guski et al. | |
| 5,661,807 A | 8/1997 | Guski et al. | |
| 6,161,185 A | 12/2000 | Guthrie et al. | |
| 6,178,508 B1 | 1/2001 | Kaufman | |
| 6,470,454 B1 | 10/2002 | Challener et al. | |
| 6,496,937 B1 | 12/2002 | Ichihara | |
| 6,601,175 B1 | 7/2003 | Arnold et al. | |
| 6,731,731 B1 * | 5/2004 | Ueshima | 379/196 |
| 7,836,407 B2 * | 11/2010 | Pettinati | 715/780 |
| 2002/0178370 A1 | 11/2002 | Gurevich et al. | |
| 2005/0015601 A1 | 1/2005 | Tabi | |
| 2005/0268345 A1 * | 12/2005 | Harrison et al. | 726/27 |
| 2012/0136572 A1 * | 5/2012 | Norton | 701/465 |

OTHER PUBLICATIONS

Freeburne, Alexander B., Patent Application entitled "System and Method of Enterprise Administrative Password Generation and Control," filed Jun. 2, 2006, U.S. Appl. No. 11/446,284.
Office Action dated Jun. 18, 2009, U.S. Appl. No. 11/446,284, filed Jun. 2, 2006.
Final Office Action dated Dec. 1, 2009, U.S. Appl. No. 11/446,284, filed Jun. 2, 2006.
Advisory Action dated Feb. 16, 2010, U.S. Appl. No. 11/446,284, filed Jun. 2, 2006.
Office Action dated Apr. 20, 2010, U.S. Appl. No. 11/446,284, filed Jun. 2, 2006.
Final Office Action dated Aug. 19, 2010, U.S. Appl. No. 11/446,284, filed Jun. 2, 2006.
Examiner's Answer dated Feb. 24, 2011, U.S. Appl. No. 11/446,284, filed Jun. 2, 2006.

* cited by examiner

*Primary Examiner* — Taghi Arani
*Assistant Examiner* — Mohammad L Rahman

(57) ABSTRACT

A password generation and validation system is provided. The system comprises a server system and an at least one memory. The system also comprises a password component stored in the at least one memory that, when executed by the server system, receives a plurality of inputs, generates a first password for a computer system based on the plurality of inputs contemporaneously with receiving the plurality of inputs, receives a second password, generates at least one candidate password based on some of the plurality of inputs, and validates the second password when the second password matches the at least one candidate password.

20 Claims, 6 Drawing Sheets

PASSWORD GENERATION AND VALIDATION SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In today's world, information security is a fundamental concern. Passwords are often used to promote information security by providing authentication. For example, a password may be used to prove identity or to gain access to a resource.

SUMMARY

In an embodiment, a password generation and validation system is disclosed. The system comprises a server system and an at least one memory. The system also comprises a password component stored in the at least one memory that, when executed by the server system, receives a plurality of inputs, generates a first password for a computer system based on the plurality of inputs contemporaneously with receiving the plurality of inputs, receives a second password, generates at least one candidate password based on some of the plurality of inputs, and validates the second password when the second password matches the at least one candidate password.

In an embodiment, a generation and validation method is disclosed. The method comprises generating, by a server system, a first password for a computer system based on a plurality of inputs. The generating the password comprises generating a string of characters from the plurality of inputs, hashing the string of characters, and normalizing the hashed string of characters to form the first password. The method also comprises generating, by the server system, one or more candidate passwords based on some of the plurality of inputs. The method further comprises validating, by the server system, a second password when the second password matches one of the one or more candidate passwords.

In an embodiment, a generation and validation method is disclosed. The method comprises generating, by a server system, a first password for a computer system based on private data, public data, and a first time. The method also comprises generating, by the server system, one or more candidate passwords. A first candidate password of the one or more candidate passwords is based on the private data, the public data, and a second time. The method further comprises validating, by the server system, a second password when the second password matches one of the one or more candidate passwords.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A password generation and validation system and method are described. The password generation and validation system and method provide an efficient means for securing information. In an embodiment, the password generation and validation system comprises a password component. The password component may provide an efficient means for securing information since the password component does not require storage or much processing. These characteristics enable the password generation and validation system and method to be applied in many information systems. For example, the password generation and validation system and method disclosed herein may be applied in a retail setting to authenticate an employee before a customer service agent provides the employee with information.

For example, in an embodiment, a salesman in a retail store may need to access secure information related to a customer and/or a product. In order to authenticate the salesman before granting them access to the secure information, the password component may generate a password for the salesman. The salesman may then speak the password over the phone to another person, for example, a customer service agent. Using the password component, the customer service agent attempts to validate the spoken password. If the spoken password is validated, the customer service agent provides the salesman with the requested secure information.

In order to increase security and reduce the likelihood of hacking, the generated password is self-expiring: after a predefined period of time the generated password is no longer considered to be valid and will not be validated. By limiting the time duration during which the generated password is valid, the exposure to an attempt to fraudulently access the secured information is reduced. Additionally, the generated password may be normalized. Normalization herein means applying one or more processes to a string of characters in order to produce a tractable password. For example, normalizing the string of characters may enable the password to be easily read, typed, and/or spoken.

Figure 1:
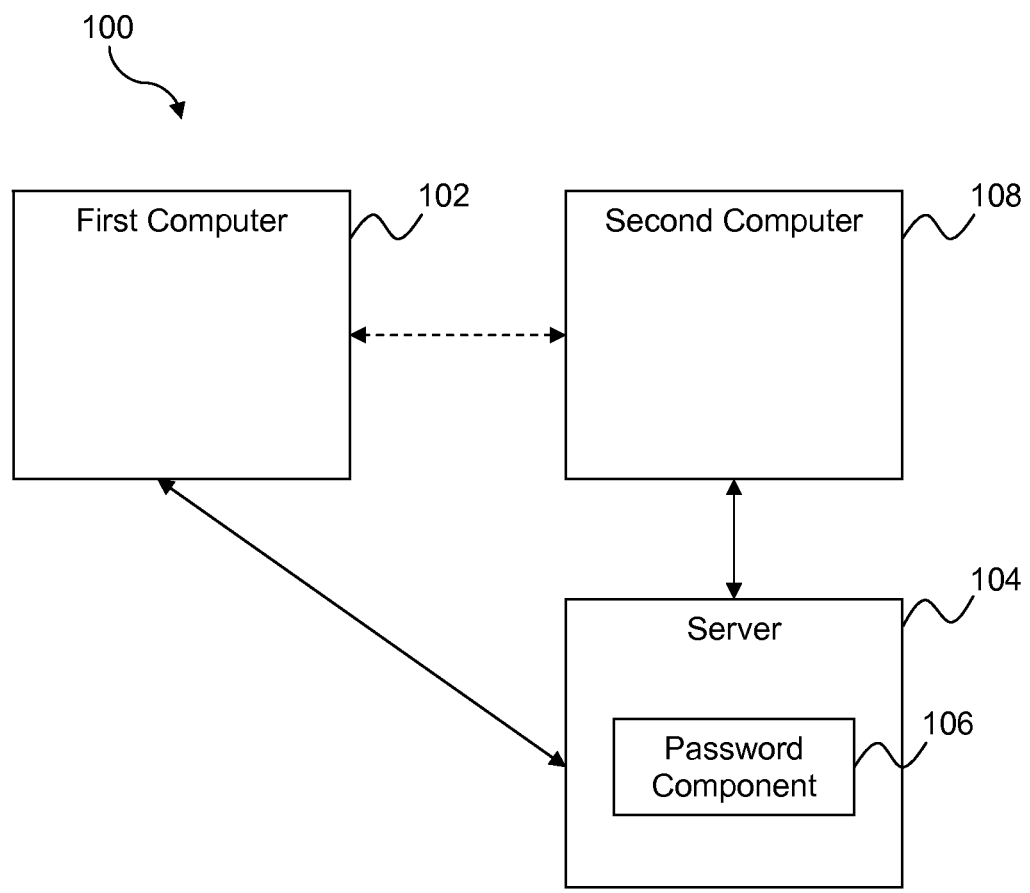
FIG. 1 is a block diagram of a password generation and validation system according to an embodiment of the disclosure.

Turning now to FIG. 1, a password generation and validation system 100 is described. In an embodiment, the system 100 comprises a first computer 102, a server 104, and a second computer 108. The first computer 102, server 104, and second computer 108 may be general purpose computers, which are described hereinafter in greater detail. In an embodiment, the first computer 102, server 104, and second computer 108 are server, desktop, or workstation computers, laptops, or mobile telephone handsets or personal digital assistants (PDAs). The first computer 102, server 104, and second computer 108 may be connected via a network, which is not specifically shown. The network may be a local area network (LAN), a wide area network (WAN), a telephone network, an intranet, the Internet, or a combination of networks.

In an embodiment, the server 104 comprises a password component 106 for generating passwords. For example, the password component 106 may generate a password for the first computer 102. In an embodiment, the first computer 102 requests the password component 106 to generate a password. In another embodiment, the password component 106 comprises an application program interface (API), which is not illustrated, such that the first computer 102 can invoke the API to gain access to the password component 106 and obtain a password. The password component 106 may also generate candidate passwords, which are used to validate passwords.

In an embodiment, the password component 106 generates a first password for the first computer 102 based on a plurality of inputs. A user of the first computer 102 may provide a second password to a user of the second computer 108. For example, the user of the first computer 102 may speak the second password to the user of the second computer 108 over a telephone. Upon receiving the second password, the user of the second computer 108 may provide the second password to the second computer 108. In an alternate embodiment, instead of a user of the first computer 102 providing the second password to a user of the second computer 108, the first computer 102 provides the second password electronically to the second computer 108 via one or more communication links.

After receiving the second password, the second computer 108 may then send the second password to the password component 106 for validation, for example pursuant to accessing secure information. In an embodiment, in order to validate the second password, the password component 106 generates one or more candidate passwords based on a plurality of inputs. The password component 106 may validate the second password when the second password matches one of the one or more candidate passwords. In an embodiment, the second password matches one of the one or more candidate passwords when the second password is identical to the first password and when the second password is received within the lifetime of the first password.

While illustrated in FIG. 1 as a single password component 106, one of ordinary skill in the art will appreciate that there may be multiple instances of the password component 106. For example, the first computer 102 and the second computer 108 may use different instances of the password component 106. The multiple instances of the password component 106 may be located on one or more back office servers, distributed across a plurality of back office servers, stored locally on the first computer 102, and/or stored locally on the second computer 108.

Figure 2:
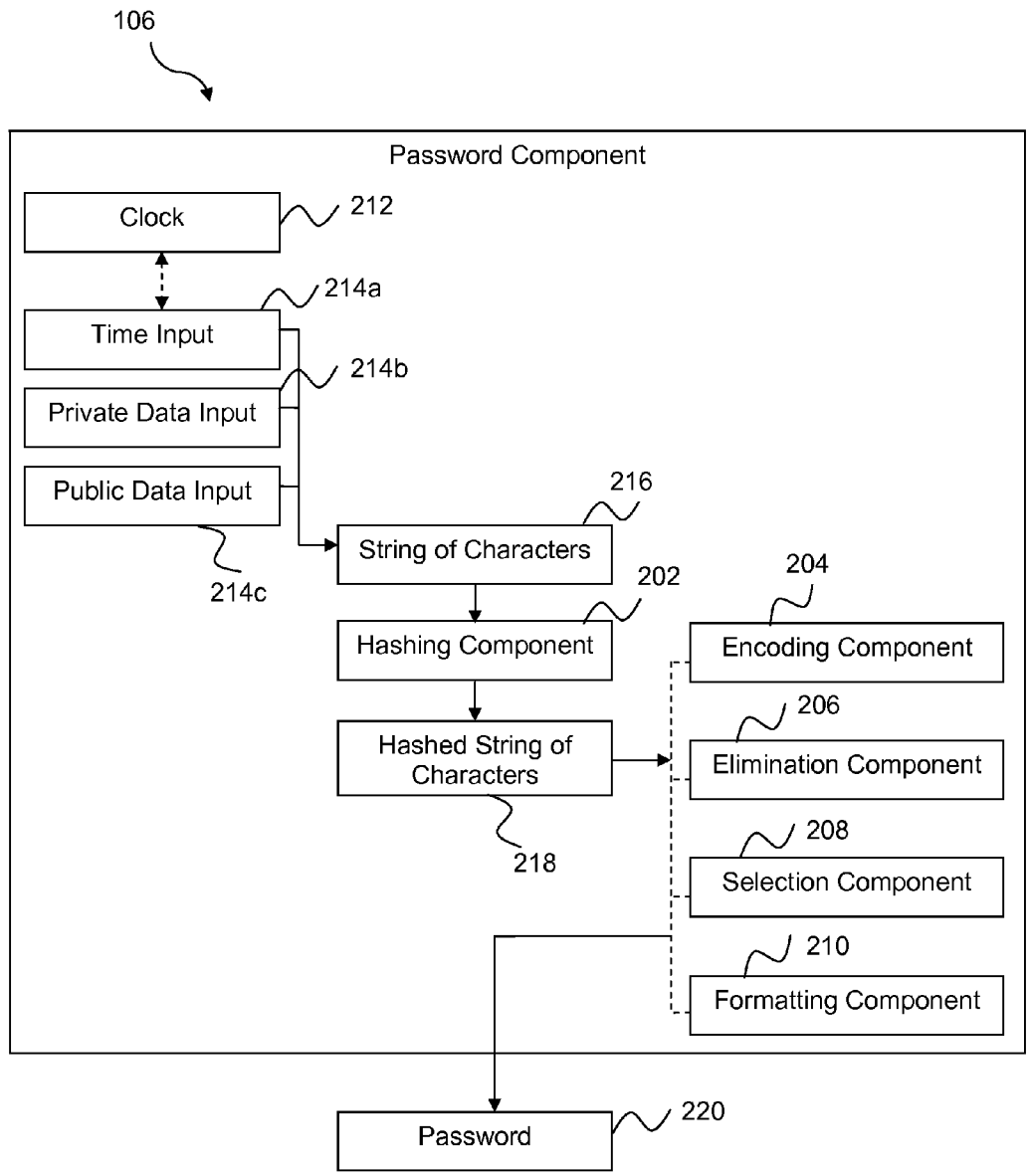
FIG. 2 is a block diagram of a password component according to an embodiment of the disclosure.

Turning now to FIG. 2, a block diagram of an embodiment of the password component 106 is provided. The password component 106 may comprise a hashing component 202, an encoding component 204, an elimination component 206, a selection component 208, and a formatting component 210. One or more of the components 202-210 may perform one or more steps for processing a plurality of inputs to generate a password 220.

In an embodiment, the plurality of inputs comprise a time input 214a, a private data input 214b, and a public data input 214c. The time input 214a may be provided by a clock 212 located on the server 104. The clock 212 may be a system clock. In an embodiment, the time input 214a is in DDDHHMM format where DDD is the day of the year, HH is the hour, and MM is the minute. Having the time input 214a in DDHHMM format rather than some other longer time format helps to reduce the size of the string of characters 216. However, the time input 214a could alternatively be in YYMMDDHHMM format where YYMMDD is year, month, and day, HH is the hour, and MM is the minute or some other time format. The time input could be a number of seconds elapsed in a predefined epoch, for example seconds elapsed since Jan. 1, 1970. The time input could be represented and/or processed in accordance with a different time keeping convention.

The time input 214a may be determined by rounding a current time to the nearest predefined time interval. For example, if the predefined time interval is selected to be 5 minutes and the current time is Jan. 17, 2011 at 9:32:23 am, the time input 214a in DDDHHMM format would be 0170930. Those of ordinary skill in the art will appreciate that the predefined time interval may be selected to be any interval of time. For instance, the predefined time interval may be 60 minutes, 30 minutes, 15 minutes, 5 minutes, 1 minute, or some other time interval. For the sake of simplicity, it may be beneficial to select a time interval that can be evenly divided into 60.

The time rounded to the nearest predefined time interval to determine the time input 214a may depend upon whether the password component 106 is generating a password 220 or validating a received password (i.e., generating one or more candidate passwords). For example, if the password component 106 is generating a password 220, the time that may be rounded to the nearest predefined time interval may be the time that the first computer 102 invoked the application program interface. In another example, if the password component 106 is validating a received password, the time that may be rounded to the nearest predefined time interval may be the time that the received password (e.g., the second password) was received by the password component 106.

The private data input 214b may be a secret key or phrase. In an embodiment, the private data input 214b is stored on the server 104 in a data store or on some other server accessible to the password component 106. The private data input 214b may be private in that it is accessible to the password component 106, but not to the first computer 102 and/or the second computer 108. To help maintain security, the private data input 214b may be changed by an administrator or some other personnel regularly such as at some periodic time interval or irregularly.

The public data input 214c may be data that is known to a user of the first computer 102. The public data input 214c may vary depending upon the context in which the password generation and validation system and methods disclosed herein are applied. For example, in a retail setting where authentication of an employee is sought, the public data input 214c may be a consumer ID, a user name, a store ID, and/or some other data know to the user of the first computer 102. To increase the strength of the generated password, two or more pieces of data can be included in the public data input 214c. The public data input 214c may be provided to the password component 106 from the first computer 102 when the first computer 102 requests generation of a password 220 or by the second computer 108 when the second computer 108 requests validation of a received password.

In an embodiment, a string of characters 216 may be formed from a plurality of inputs. For example, the string of characters 216 may be formed from the time input 214a, the private data input 214b, and the public data input 214c. The string of characters 216 may be manipulated sequentially or in parallel by one or more of the components 202-210.

The hashing component 202 may alter the string of characters 216 by applying a one-way hashing algorithm to the string of characters 216. In an embodiment, applying a one-way hashing algorithm to the string of characters 216 produces a hashed string of characters 218 that is not easily, if at all, able to be reversed back into the plurality of inputs used to create the string of characters 216. For example, the hashing component 202 may apply a one-way hashing algorithm such as SHA-1, MD5, or another hashing algorithm. In some embodiments, the hashed string of characters 218 that results from the hashing component 202 is the password 220. Such an embodiment may be, for example, when the first computer 102 communicates a password directly to the second computer 108. In other embodiments, such as when a user of the first computer 102 speaks a password to a user of the second computer 108, the hashed string of characters 218 is further manipulated by one or more of the components 204-210 to produce the password 220.

The encoding component 204 may alter the hashed string of characters 218 by applying an encoding algorithm, which re-represents the hashed string of characters 218 in another format. For example, the encoding component 204 may apply an encoding algorithm such as a Base64 encoding algorithm or another encoding algorithm.

The elimination component 206 may eliminate non-numeric and non-alphabetic characters from the hashed string of characters 218. For example, applying an encoding algorithm may result in an encoded string of characters that comprises one or more non-numeric and non-alphabetic characters such as a slash or an equal sign. In an embodiment, the elimination component 206 would eliminate these non-numeric and non-alphabetic characters from the hashed string of characters 218 in a deterministic predetermined manner.

The selection component 208 may select one or more characters of the hashed string of characters 218. The selection component 208 may select any number of characters from the hashed string of characters 218. The number of characters selected by the selection component 208 may depend upon the context in which the password generation and validation system and methods disclosed herein are applied. For example, if the password 220 is going to be spoken, the selection component 208 may select a number of characters from the hashed string of characters 218 that may be easily spoken.

In an embodiment, the selection component 208 selects "x" number of characters from the hashed string of characters 218 by selecting the first x number of characters from the hashed string of characters 218 or the last x number of characters from the hashed string of characters 218. In other embodiments, the selection component 208 selects "x" number of characters from the hashed string of characters 218 by applying a selection rule. For example, the selection component 208 may select every other character or every third character from the hashed string of characters 218 until x number of characters has been selected. One of ordinary skill in the art will appreciate that any number of selection rules may be applied by the selection component 208 to the hashed string of characters 218 to select "x" number of characters without departing from the scope of the present disclosure.

The formatting component 210 may format the hashed string of characters 218. For example, the formatting component 210 may uppercase or lowercase all of the alphabetic characters in the hashed string of characters 218. Formatting the hashed string of characters 218 such that the alphabetic characters are consistent (e.g., uppercased or lowercased) may enable the password 220 to be more easily spoken.

Figure 3:
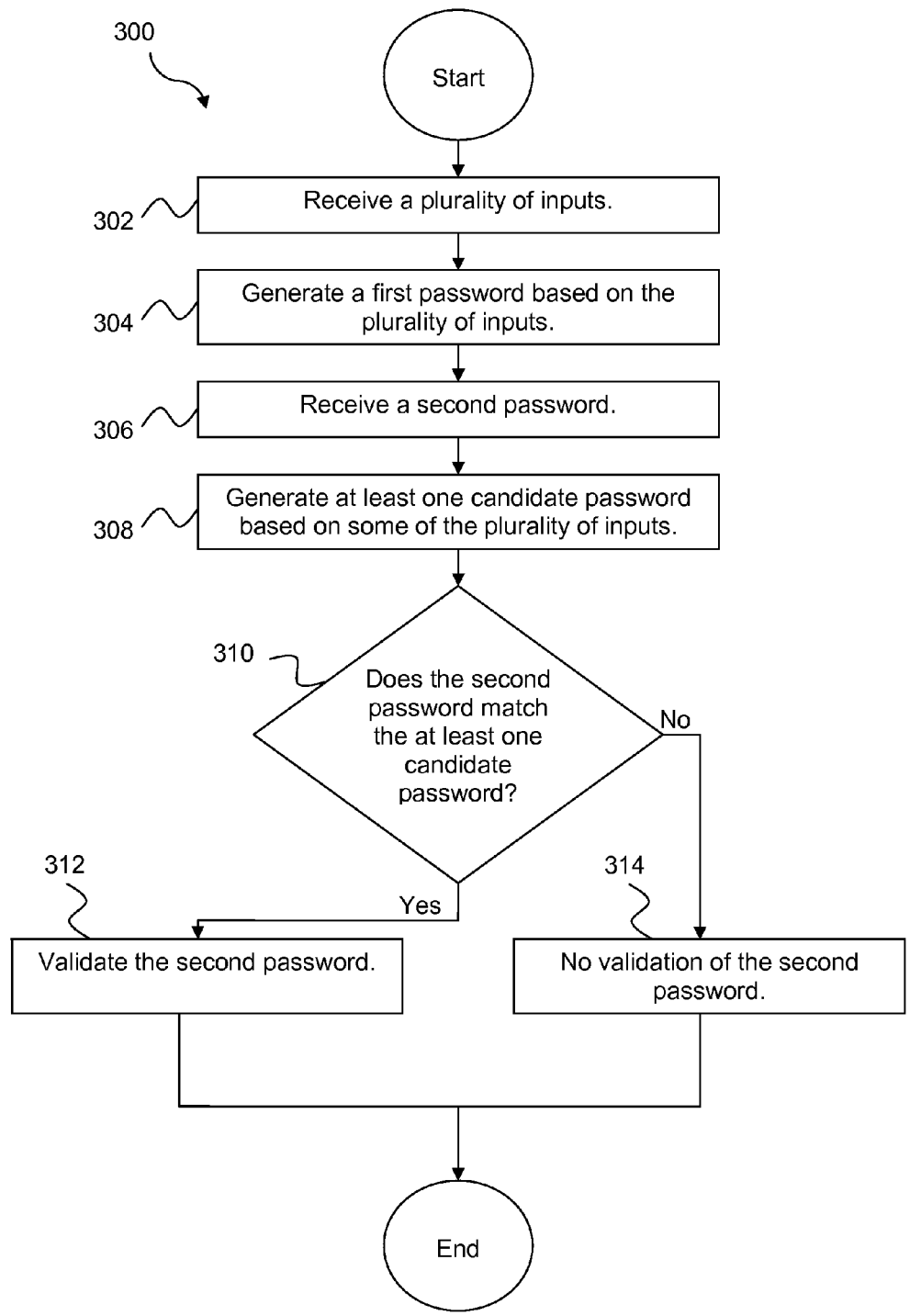
FIG. 3 is a flow chart of a method for generating and validating a password according to an embodiment of the disclosure.

Turning now to FIG. 3, a method 300 for generating and validating a password is described. At block 302, the password component 106 receives a plurality of inputs. The plurality of inputs may comprise a time input 214a, a private data input 214b, and a public data input 214c. In an embodiment, the password component 106 receives the plurality of inputs from the first computer 102, the server 104, the second computer 108, and/or another server.

At block 304, the password component 106 generates a first password based on the plurality of inputs. The password component 106 may generate the first password for the first computer 102. In an embodiment, the password component 106 generates the first password contemporaneously with receiving the plurality of inputs. Contemporaneously herein may mean that the first password is generated at about the same time as receiving the plurality of inputs. Stated differently, contemporaneously herein means that there is no generation and/or population of a kernel (e.g., a hashed string of characters) prior to the generation of the password. The steps involved in generating a password will be more fully described hereinafter with regard to FIG. 4.

At block 306, the password component 106 receives a second password. For example, the password component 106 may receive the second password from the second computer 108. The second password may have been provided to and inputted into the second computer 108 by a user of the second computer 108. For example, a user of the first computer 102 may have spoken the password to a user of the second computer 108 and the user of the second computer 108 may have entered the spoken password into the second computer 108. Alternatively, the second computer 108 may have received the second password electronically from the first computer 102 or another computer. The second password may or may not be equivalent to the first password.

At block 308, the password component 106 generates at least one candidate password based on some of the plurality of inputs. For example, the password component 106 may generate the at least one candidate password based on a time input 214a, a private data input 214b, and a public data input 214c. The public data input 214c may be provided to the password component 106 by the second computer 108 at approximately the same time as the second password. In an embodiment, a user of the first computer 102 may speak the public data input 214c to a user of the second computer 108 and the user of the second computer 108 may enter the public data input 214c into the second computer 108. Alternatively, the public data input 214c may be provided directly to the password component 106 from the first computer 102 or another computer. To generate the at least one candidate password, the password component 106 may use the same private data input 214b and/or the same public data input 214c as was used to create the first password. However, depending upon when the second password was received, the time input used to generate the first password may not be the same time input used to generate the at least one candidate password. In such a case, the newly generated password (e.g., the second password) would be different from the first password.

At block 310, the password component 106 determines if the second password matches the at least one candidate password. The steps involved in generating the at least one candidate password and determining if the second password matches the at least one candidate password will be more fully described hereinafter with regard to FIG. 5.

If the password component 106 determines that the second password matches the at least one candidate password at block 310, then at block 312 the password component 106 validates the second password. Alternatively, if the password component 106 determines that the second password does not match the at least one candidate password at block 310, then at block 314 the password component 106 does not validate the second password.

Figure 4:
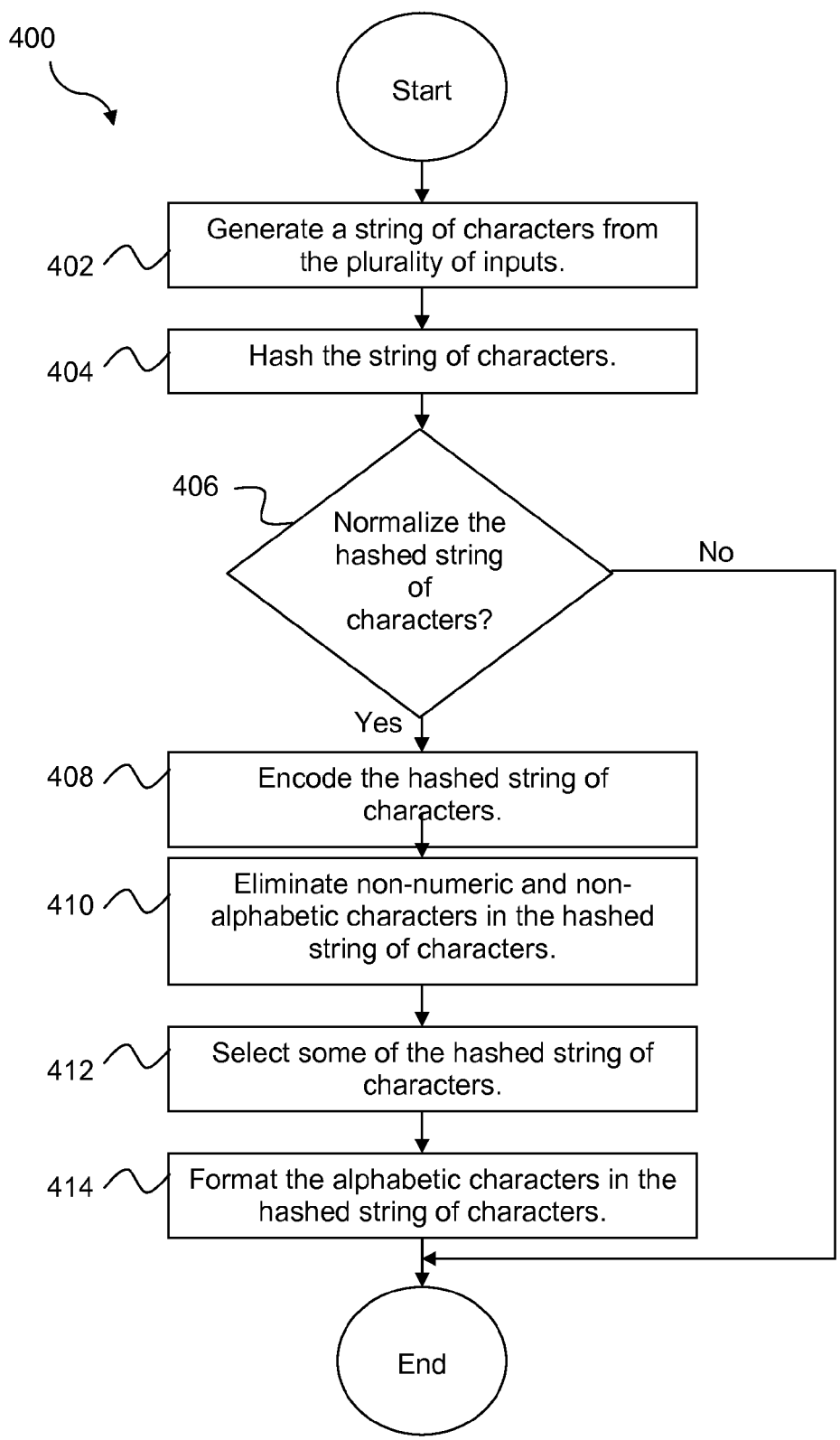
FIG. 4 is a flow chart of a method for generating a password according to an embodiment of the disclosure.

Turning now to FIG. 4, a method 400 for generating a password is described. As mentioned above, the method 400 may be performed at block 304 of FIG. 3. At block 402, the password component 106 generates a string of characters 216 from the plurality of inputs. At block 404, the password component 106 hashes the string of characters 216. The password component 106 may hash the string of characters 216 by applying a hashing algorithm such as SHA-1 or MD5.

At block 406, a determination is made whether the hashed string of characters 218 is to be normalized. Normalization produces a password that is tractable. The hashed string of characters 218 may be normalized if, for example, the password 220 is going to be spoken. In contrast, the hashed string of characters 218 may not be normalized if, for example, the password 220 is going to be provided electronically to the second computer 108 by the first computer 102.

If the hashed string of characters 218 is to be normalized (i.e., a "yes" at block 406), then one or more of blocks 408-414 are performed by the password component 106. At block 408, the password component 106 or, more specifically, the encoding component 204, encodes the hashed string of characters 218. The password component 106 may encode the hashed string of characters 218 by applying an encoding algorithm such as a Base64 encoding algorithm.

At block 410, the password component 106 or, more particularly, the elimination component 206, eliminates non-numeric and non-alphabetic characters in the hashed string of characters 218. At block 412, the password component 106 or, more specifically, the selection component 208, selects some of the hashed string of characters 218. For example, the password component 106 may select some of the hashed string of characters 218 in a predetermined way.

At block 414, the password component 106 or, more particularly, the formatting component 210, formats the alphabetic characters in the hashed string of characters 218. For example, the password component 106 may format the alphabetic characters in the hashed string of characters 218 consistently by uppercasing or lowercasing the alphabetic characters.

While method 400 illustrates performing all of blocks 408-414 when the hashed string of characters 218 is to be normalized, the normalization of the hashed string of characters 218 may only require performing one or more, but not all, of blocks 408-414. The result of performing the one or more of blocks 408-414 to the hashed string of characters 218 is the password 220. If the hashed string of characters 218 is not to be normalized (i.e., a "no" at block 406), then the hashed string of characters 218 is the password 220.

Figure 5:
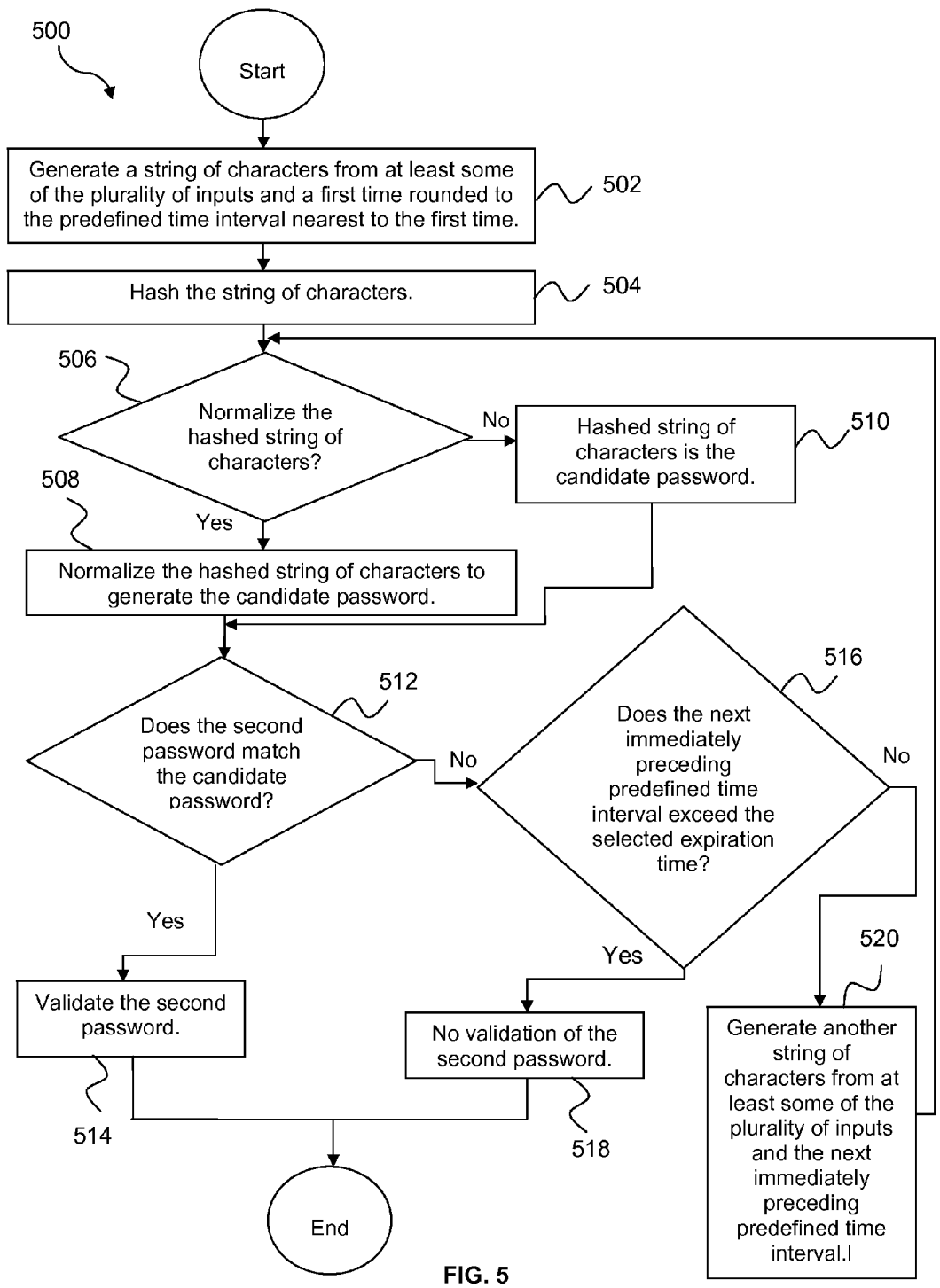
FIG. 5 is a flow chart of a method for generating one or more candidate passwords according to an embodiment of the disclosure.

Turning now to FIG. 5, a method 500 for generating one or more candidate passwords is described. As mentioned above, the method 500 may be performed at blocks 308 and 310 of FIG. 3. At some time prior to block 502, an expiration time for the generated passwords and a time interval for the generated passwords may be selected. One of ordinary skill in the art will appreciate that the expiration time may be selected to be any amount of time. Similarly, one of ordinary skill in the art will appreciate that the time interval may be selected to be any time interval. However, the longer the selected expiration time and/or the greater the selected time interval, the less secure the generated passwords will be. To help explain method 500, an example will be provided throughout the discussion of blocks 502-520 below. In regard to the example provided below, assume that an expiration time of 10 minutes and a time interval of 5 minutes are selected.

At block 502, the password component 106 generates a string of characters 216 from at least some of the plurality of inputs and a first time rounded to the predefined time interval nearest to the first time. The at least some of the plurality of inputs may comprise a private data input 214b and a public data input 214c. In an embodiment, the first time is the time when the password component 106 receives the second password. The received time may be determined by the clock 212. Thus, for example, if the second password is received by the password component 106 on Jan. 17, 2011 at 9:35:40 am, assuming that the time interval is selected to be 5 minutes, the first time rounded to the predefined time interval nearest to the first time would be 0170935 in DDDHHMM format.

At block 504, the password component 106 hashes the string of characters 216. This block may be identical to block 404 of FIG. 4. At block 506, a determination is made whether the hashed string of characters 218 is to be normalized. This block may be identical to block 406 of FIG. 4. If the hashed string of characters 218 is to be normalized (i.e., a "yes" at block 506), then at block 508, the password component 106 normalizes the hashed string of characters 218 to generate the candidate password. Block 508 may comprise one or more of blocks 408-414 of FIG. 4. If the hashed string of characters 218 is not to be normalized (i.e., a "no" at block 506), then at block 510, the hashed string of characters 218 is the candidate password.

At block 512, the password component 106 determines if the second password matches the candidate password generated from block 508 or block 510. If the second password matches the candidate password generated at block 508 or block 510, then at block 514, the password component 106 validates the second password.

If the second password does not match the candidate password generated at block 508 or block 510, then at block 516 it is determined if the next immediately preceding predefined time interval exceeds the selected expiration time. For example, continuing with the above example, the next immediately preceding predefined time interval would be 0170930 in DDDHHMM format. This predefined time interval would not exceed the 10 minute expiration time because it is only 5 minutes from the time interval nearest to the first time (i.e., 0170935).

If the next immediately preceding defined time interval exceeds the selected expiration time, then at block 518, the password component 106 does not validate the second password. If the next immediately preceding defining time interval does not exceed the selected expiration time, such as in the example above, then the method proceeds to block 520. At block 520, the password component 106 generates another string of characters 216 from the at least some of the plurality of inputs and the next immediately preceding predefined time interval. After block 520, the method proceeds back to block 506 and repeats.

In an embodiment, as is illustrated in FIG. 5, the password component 106 generates each candidate password and determines if the second password matches the generated candidate password one at a time. Alternatively, the password component 106 may generate all possible candidate passwords and then make a single determination of whether the second password matches any of the possible candidate passwords.

Figure 6:
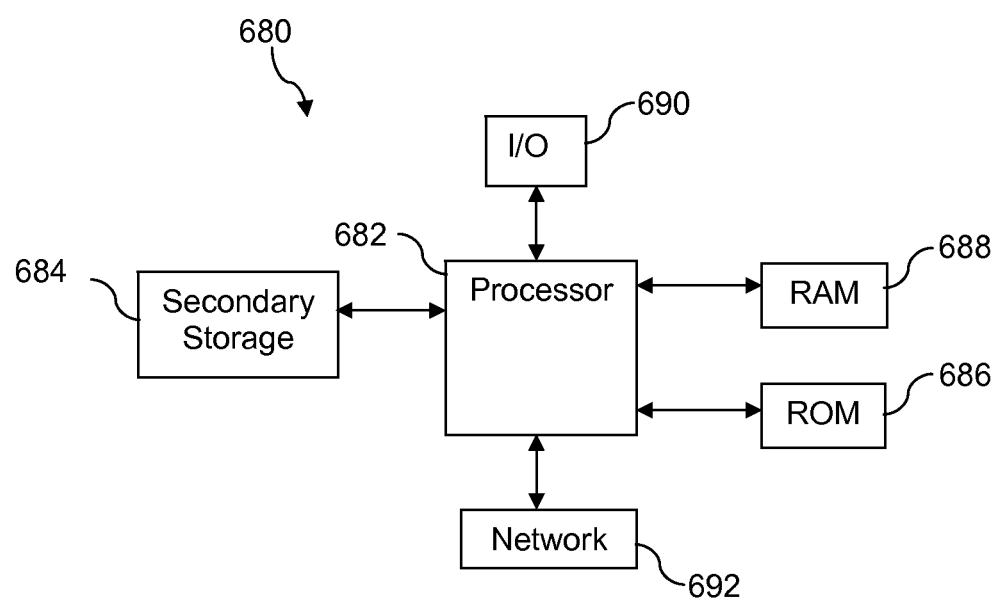
FIG. 6 illustrates an exemplary computer system suitable for implementing the several embodiments of the disclosure.

FIG. 6 illustrates a computer system 680 suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684. The secondary storage 684, the RAM 688, and/or the ROM 686 may be referred to in some contexts as computer readable storage media and/or non-transitory computer readable media.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 692 may enable the processor 682 to communicate with the Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 684, for example, hard drives, floppy disks, optical disks, and/or other device, the ROM 686, and/or the RAM 688 may be referred to in some contexts as non-transitory instructions and/or non-transitory information.

In an embodiment, the computer system 680 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 680 to provide the functionality of a number of servers that is not directly bound to the number of computers in the computer system 680. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 680, at least portions of the contents of the computer program product to the secondary storage 684, to the ROM 686, to the RAM 688, and/or to other non-volatile memory and volatile memory of the computer system 680. The processor 682 may process the executable instructions and/or data structures in part by directly accessing the computer program product, for example by reading from a CD-ROM disk inserted into a disk drive peripheral of the computer system 680. Alternatively, the processor 682 may process the executable instructions and/or data structures by remotely accessing the computer program product, for example by downloading the executable instructions and/or data structures from a remote server through the network connectivity devices 692. The computer program product may comprise instructions that promote the loading and/or copying of data, data structures, files, and/or executable instructions to the secondary storage 684, to the ROM 686, to the RAM 688, and/or to other non-volatile memory and volatile memory of the computer system 680.

In some contexts, a baseband signal and/or a signal embodied in a carrier wave may be referred to as a transitory signal. In some contexts, the secondary storage 684, the ROM 686, and the RAM 688 may be referred to as a non-transitory computer readable medium or a computer readable storage media. A dynamic RAM embodiment of the RAM 688, likewise, may be referred to as a non-transitory computer readable medium in that while the dynamic RAM receives electrical power and is operated in accordance with its design, for example during a period of time during which the computer system 680 is turned on and operational, the dynamic RAM stores information that is written to it. Similarly, the processor 682 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A password generation and validation system, comprising:
    a server system;
    an at least one memory; and
    a password component stored in the at least one memory that, when executed by the server system,
        receives a plurality of inputs,
        generates a first password for a computer system based on the plurality of inputs contemporaneously with receiving the plurality of inputs,
        receives a second password,
        receives a selected expiration time for the first password and a selected time interval,
        generates at least one candidate password based on some of the plurality of inputs, wherein the number of candidate passwords depends upon the selected expiration time for the first password and the selected time interval, and
        validates the second password when the second password matches the at least one candidate password.

2. The password generation and validation system of claim of claim 1, wherein the password component comprises a hashing component to form the first password by creating a string of characters based on the plurality of inputs.

3. The password generation and validation system of claim 1, wherein the password component comprises:
    a hashing component to create a string of characters based on the plurality of inputs;
    an encoding component to encode the string of characters;
    an elimination component to eliminate non-numeric and non-alphabetic characters in the string of characters; and
    a selection component to select some of the string of characters to form the first password.

4. The password generation and validation system of claim 3, wherein the password component further comprises a formatting component to uppercase alphabetic characters in the string of characters.

5. The password generation and validation system of claim 1, wherein the plurality of inputs comprises private data, public data, and a time.

6. The password generation and validation system of claim 5, wherein the at least one candidate password is based on the private data, the public data, and one of a current time and a previous time.

7. The password generation and validation system of claim 1, wherein the second password is spoken by a first user and inputted by a second user into the computer system for validation.

8. The password generation and validation system of claim 1, wherein the second password matches the at least one candidate password when the second password is identical to the first password and when the second password is received within the lifetime of the first password.

9. A password generation and validation method, comprising:
   generating, by a server system, a first password for a computer system based on a plurality of inputs, wherein generating the first password comprises:
      generating a string of characters from the plurality of inputs,
      hashing the string of characters, and
      normalizing the hashed string of characters to form the first password;
   receiving, by the server system, a selected expiration time for the first password and a selected time interval,
   generating, by the server system, one or more candidate passwords based on some of the plurality of inputs, wherein the number of candidate passwords depends upon the selected expiration time for the first password and the selected time interval; and
   validating, by the server system, a second password when the second password matches one of the one or more candidate passwords.

10. The password generation and validation method of claim 9, wherein normalizing the string of characters comprises at least one eliminating characters from the hashed string of characters, selecting characters from the hashed string of characters, upper casing characters from the hashed string of characters, wherein the at least one of eliminating, selecting, and upper casing enables the first password to be spoken.

11. The password generation and validation method of claim 9, wherein normalizing the hashed string of characters comprises:
   encoding the hashed string of characters;
   eliminating non-numeric and non-alphabetic characters in the hashed string of characters; and
   selecting some of the hashed string of characters to form the first password.

12. The password generation and validation method of claim 10, wherein normalizing the hashed string of characters further comprises uppercasing alphabetic characters in the string of characters.

13. The password generation and validation method of claim 9, wherein the plurality of inputs comprises private data, public data, and a time.

14. The password generation and validation method of claim 13, wherein the time is rounded to a nearest predefined time interval.

15. The password generation and validation method of claim 14, wherein the nearest predefined time interval is one of 60 minutes, 30 minutes, 15 minutes, 5 minutes, 1 minute.

16. A password generation and validation method, comprising:
   generating, by a server system, a first password for a computer system based on private data, public data, and a first time;
   selecting an expiration time for the first password and a time interval, wherein the first time is rounded to the time interval nearest to the first time;
   generating, by the server system, one or more candidate passwords, wherein a first candidate password of the one or more candidate passwords is based on the private data, the public data, and a second time, wherein the second time is rounded to the time interval nearest to the second time, and wherein a second candidate password of the one or more candidate passwords is based on the private data, the public data, and the time interval immediately preceding the time interval nearest to the second time; and
   validating, by the server system, a second password when the second password matches one of the one or more candidate passwords.

17. The password generation and validation method of claim 16, wherein the number of candidate passwords depends upon the selected expiration time for the first password and the selected time interval.

18. The password generation and validation method of claim 9, wherein a first time associated with the first password is rounded to the time interval nearest to the first time and wherein a second time associated with the candidate password is rounded to the time interval nearest to the second time.

19. The password generation and validation method of claim 9, wherein a second candidate password of the one or more candidate passwords is based on the private data, the public data, and the time interval immediately preceding the time interval nearest to the second time.

20. The password generation and validation system of claim 1, wherein a first time associated with the first password is rounded to the time interval nearest to the first time and wherein a second time associated with the at least one candidate password is rounded to the time interval nearest to the second time.

* * * * *